United States Patent [19]

Elliot

[11] Patent Number: 4,610,361

[45] Date of Patent: Sep. 9, 1986

[54] CONVEYOR AND ASSOCIATED CONTROL SYSTEM FOR SORTING POULTRY CARCASSES

[75] Inventor: Eric Elliot, Athens, Ga.

[73] Assignee: AutoSystems Limited, Yorkshire, England

[21] Appl. No.: 666,019

[22] Filed: Oct. 29, 1984

Related U.S. Application Data

[63] Continuation of Ser. No. 570,340, Jan. 13, 1984, abandoned, which is a continuation of Ser. No. 451,222, Dec. 20, 1982, abandoned, which is a continuation of Ser. No. 308,872, Oct. 5, 1981, abandoned, which is a continuation of Ser. No. 186,996, Sep. 15, 1980, abandoned, which is a continuation of Ser. No. 927,063, Jul. 21, 1978, abandoned.

[30] Foreign Application Priority Data

Jul. 23, 1977 [GB] United Kingdom ............... 31025/77

[51] Int. Cl.$^4$ .................... B07C 5/36; B65G 47/50
[52] U.S. Cl. ................................ 209/555; 209/564; 209/593; 209/912; 364/478; 414/136
[58] Field of Search ............. 209/555, 557, 562–566, 209/592, 595, 912; 414/134, 136; 104/88; 364/478; 377/17

[56] References Cited

U.S. PATENT DOCUMENTS

| | | | |
|---|---|---|---|
| 3,087,063 | 4/1963 | Gatzert | 209/563 X |
| 3,291,303 | 12/1966 | Altenpohl, Jr. | 209/912 X |
| 3,652,828 | 3/1972 | Sather et al. | 209/566 |
| 3,696,946 | 10/1972 | Hunter et al. | 414/134 |
| 3,785,510 | 1/1974 | Grooteboer | 414/136 |
| 4,021,336 | 5/1977 | Brook et al. | 209/593 X |
| 4,024,053 | 5/1977 | Drew, Jr. et al. | 209/593 |
| 4,096,950 | 6/1978 | Brook | 209/593 |
| 4,134,498 | 1/1979 | Jones et la. | 209/564 |

*Primary Examiner*—Randolph A. Reese
*Assistant Examiner*—Edward M. Wacyra
*Attorney, Agent, or Firm*—John C. Smith, Jr.

[57] ABSTRACT

A conveyor system for sorting poultry carcasses comprises a plurality of poultry carcass carriers arranged successively to convey a plurality of carcasses along a closed path past a plurality of data input stations and then a plurality of carcass release stations. Sensors positioned along the conveyor path, one at each of the data input and release stations, are connected to a controller for receiving poultry grade and weight data from the data input stations, processing the data, and transmitting the resultant classifying data to the release stations for the selective release of carcasses from the carriers. The conveyor system maintains an individual identification of the poultry carcass carriers passing through each of the stations independent of the distance between the carriers and independent of the time lapse between a poultry carcass carrier passing one station and the next station.

9 Claims, 5 Drawing Figures

CONVEYOR AND ASSOCIATED CONTROL SYSTEM FOR SORTING POULTRY CARCASSES

This application is a continuation of application Ser. No. 570,340 filed Jan. 13, 1984, now abandoned, which is a continuation of application Ser. No. 451,222 filed Dec. 20, 1982, now abandoned, which is a continuation of application Ser. No. 308,872 filed Oct. 5, 1981, now abandoned, which is a continuation of application Ser. No. 186,996 filed Sept. 15, 1980, now abandoned, which is a continuation of application Ser. No. 927,063 filed July 21, 1978, now abandoned.

The invention relates to conveyors.

Conveyors are known, for example from U.S. Pat. No. 4,021,336, in which a plurality of articles are conveyed in succession along a path, at one station along the path information is obtained about each article, e.g. information about its weight, and at a subsequent station downstream of the first station the information is utilised, for example to sort the articles according to weight. In most processing plants where such conveyors are used, the distance between the first station and subsequent station is such that a whole set of articles have passed the first station before the first article of the set reaches the subsequent station and so means must be provided to store information obtained at the first station and synchronise the storage with the movement of the articles so that when each article reaches the subsequent station the information previously obtained about that article is made available.

Known systems have relied on using shift registers to store information, each item of information being stepped through a shift register in synchronism with the movement of the articles so that an item of information emerges from a shift register at the same time as the article which originally initiated the information reaches the subsequent station.

Such systems have two serious disadvantages. Firstly the size of the shift registers must be closely related to the way in which an article travels from the first station to the subsequent station. For instance where the articles are normally evenly spaced-apart the number of sections in a shift register may be equal to the number of articles lying between the first station and the subsequent station as in U.S. Pat. No. 4,021,336. Should however this spacing alter slightly, the operation of the shift registers may get out of synchronisation with the result that every single subsequent operation of the conveyor system is incorrect.

Secondly, since the construction of the control circuitry is closely linked to the construction of the conveyor, and in particular the distance and positioning of the stations, it is not possible to alter the positions of the stations without altering the control circuitry.

It is an object of the invention to provide a conveyor which does not suffer from the above mentioned disadvantages.

We have now realised that a far more accurate and flexible system can be provided if the control unit can recognise each article individually when the article reaches a station. It can thus store information in a manner which associates that information with the article which generated it, and when the same article is recognised at a subsequent station, recall the information which it has associated with that article.

Thus the invention provides a conveyor comprising a plurality of article carriers operable to convey a succession of articles along a path, at least one operating station along the path, operating means at the operating station to carry out an operation on one or more articles as the articles are moved through the operating station, a control unit connected to the operating means to receive from the operating means information related to each article carrier and any article carried thereby, characterised by means to identify each individual article carrier as it reaches the operating station so that the control unit can associate each piece of information with a particular article carrier.

The control unit may have a plurality of memory sections, at least one for each article carrier, each memory section being arranged to store information related to an associated article.

I have discovered a very simple means of enabling the control unit to recognise article carriers individually. The means to identify each article carrier may comprise a counter arranged to count the article carriers as they move past the operating station so that each article carrier is associated with a particular number.

The counter may receive the information from the operating means and direct the information into one of the memory sections, the memory section selected to receive the information depending on the number of the article carrier which initiated the information.

Other important objects and features of the invention will become apparent from the following description of embodiments of the invention, given by way of example.

Figure 1:
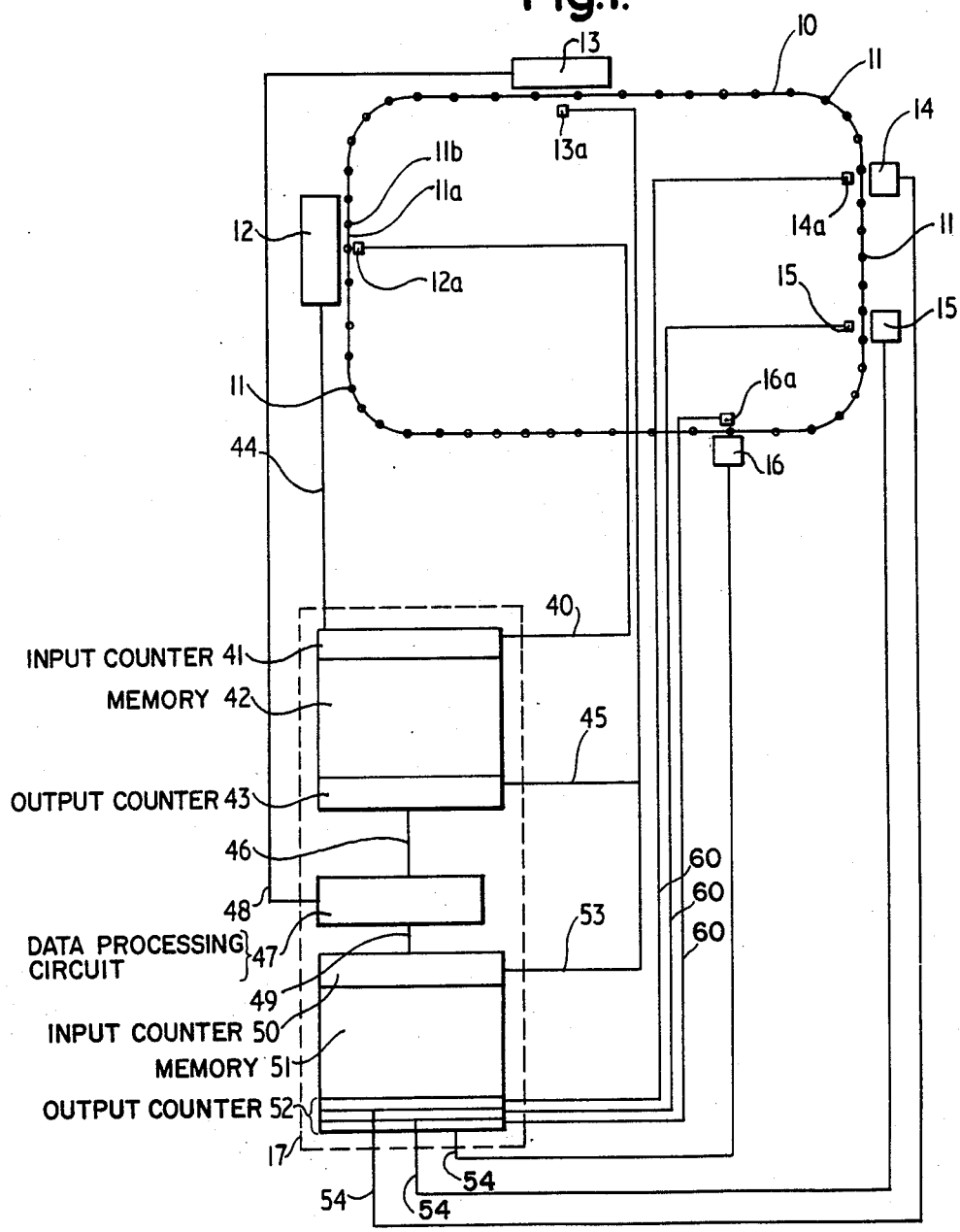
FIG. 1 is a diagrammatic view of part of one embodiment of a conveyor according to the invention.

The invention is particularly applicable to continuous overhead chain conveyors and one such conveyor 10 is shown in FIG. 1 having fifty poultry carcass carrying shackles suspended therefrom and illustrated diagrammatically at 11. The conveyor travels along an endless path which commences at a poultry grading station 12, passes through a poultry weighing station 13, and then passes through three poultry removal stations 14, 15 and 16, before returning again to the grading station 12.

In use, poultry carcasses are each attached to shackles in succession, and are then graded, at the station 12. The carcasses are then automatically conveyed through the weighing station 13 and weighed, and the carcasses are subsequently removed at the stations 14, 15 and 16, depending on the grade and weight of each carcass.

The principle behind the invention resides in the fact that when an article being conveyed generates a piece of information for use in processing the article, a further piece of identifying information, for example, a number, is also generated which associates that piece of processing information with the article which generated it. This principle will first be illustrated with reference to FIG. 2 which shows one of the shackles 11a of a poultry carcass carrying conveyor, similar to that shown in FIG. 1, approaching a processing station.

The shackles 11a carries a carcass 21 and is suspended from wheels 22 which run along an overhead rail 23 in the direction of arrow A. All the shackles are interconnected by a driving chain 24. The shackle has a first piece of metal 25 secured thereto for actuating a first sensor 26 and a second piece of metal 27 for use in actuating a second sensor 28 positioned slightly downstream of the sensor 26.

The two sensors 26 and 28 are connected to a combined counting and gating device 29. The device 29 has an input 30 arranged to receive some information from the processing station, for example information relating to the grade, weight, or other property of the carcass. The device 29 is coupled to a memory 31 which has at least as many storage sections as there are shackles, and a plurality of connections 32 enable any of the storage sections of the memory to be addressed by the device 29.

When the shackle 11a reaches the sensor 26 this sensor is actuated by the metal 25 and a signal travels to the device 29 setting its count to zero. When the shackle reaches sensor 28 a pulse is generated by the metal 27 and is passed to the device 29, causing its count to rise to 1. This connects the input 30 of the device 29 to a first section of the memory 31 so that when the shackle 11a generates a processing signal at the station in question this signal passes along line 30 into the first section of the memory 31 where it is stored.

All the other shackles only have a piece of metal similar to 27, and do not have the piece of metal 25, so when the next succeeding shackle arrives at the processing station, there is a further pulse from sensor 28, causing the count in device 29 to progress to 2. Thus the processing information about the second shackle is stored in a second section of the memory, processing information about the third shackle is stored in a third section of the memory, and so on.

The stored information can be consulted for use at later processing stations by virtue of an output counting and gating device 33 also connected to the memory 31. Connections 34 enable any of the memory sections to be addressed by the device 33, the particular memory section being addressed at any one time depending on the count received by the device 33. The device 33 also has an output line 35, counting input 36 and resetting input 37.

Any station downstream which requires the information stored in the memory 31 is provided with sensors similar to sensors 26 and 28 coupled to the lines 37 and 36 respectively.

When the shackle 11a reaches this station, device 33 is first reset to zero and then receives a count of 1, so that the output line 35 is coupled to the first section of the memory and the information therein can be recalled for use. Similarly when any other shackle reaches the downstream station it generates its own number so that the output 35 is coupled to its own memory section.

Because each station is arranged to count the shackles individually and thus identify each shackle individually, the conveyor has much greater flexibility than known conveyor systems, which rely on the time taken for a shackle to travel from one station to another, or on the distance between two stations, to ensure that operations on one particular shackle are co-ordinated. In a known system, the distance between two stations cannot be altered without also altering the control circuitry. Furthermore, if the spacing between shackles alters, for example as a result of wear of chain links interconnecting the shackles, then the synchronisation of the conveyor may be affected, with the result that the wrong carcasses are processed at the wrong time.

The invention enables the distance between stations to be altered at will, and there is no requirement for the shackles to have a uniform spacing. Each station identifies each shackle by counting the shackles starting with the datum shackle 11a and so if the spacing of any or all of the stations on a conveyor system is varied, it will not make any difference to the effective operation of the system, and there is no requirement whatsoever to change the control circuitry. Each memory section still receives the correct information about the carcass carried on the associated shackle, and stores this for recall when required.

When a full cycle has been completed and the shackle 11a arrives at the first station carrying a new carcass, the device 29 is again set to zero and the process starts all over again.

Figure 3:
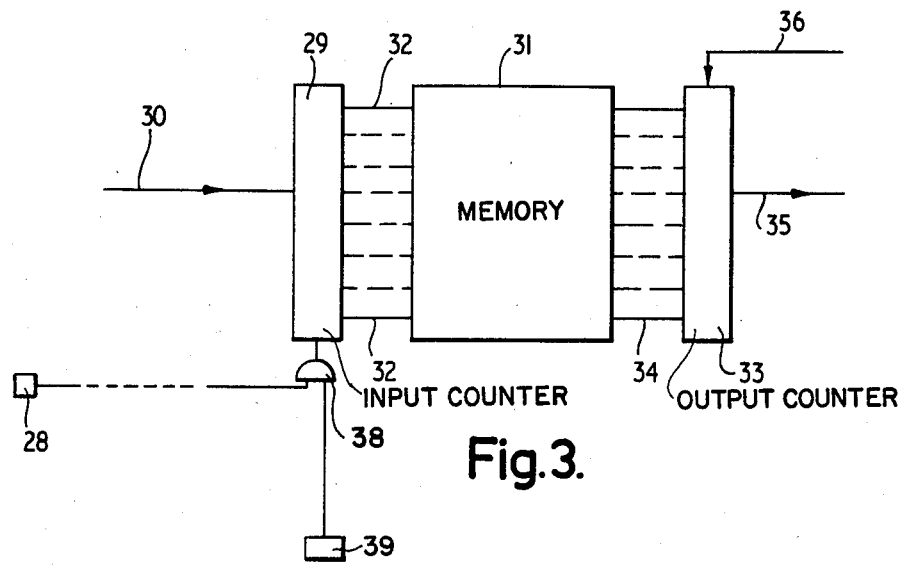
FIG. 3 is a diagrammatic view of the control unit of yet another embodiment of a conveyor according to the invention.

It may be possible to dispense with the piece of metal 25 and resetting sensor 26. If the piece of metal 27 is made longer on shackle 11a than on the other shackles, sensor 28 (and the equivalent sensor at other stations) will generate a longer pulse than the other shackles, and the counting device 29 and 30 can be arranged to detect this longer signal and utilise it to reset the devices to 1, corresponding to the first shackle of a series. However it would be desirable to provide a safeguard as shown in FIG. 3 to prevent resetting erroneously should the conveyor stop while an ordinary shackle was adjacent to the sensor 28. This would also produce a long signal. As shown in FIG. 3 the sensor 28 could be coupled to the device 29 via an AND gate 38, the AND gate normally being maintained closed by a signal from a device 39 controlled by the conveyor driving means. If the conveyor stops, the gate 38 opens and so the sensor 28 does not provide a longer signal than normal.

Figure 2:
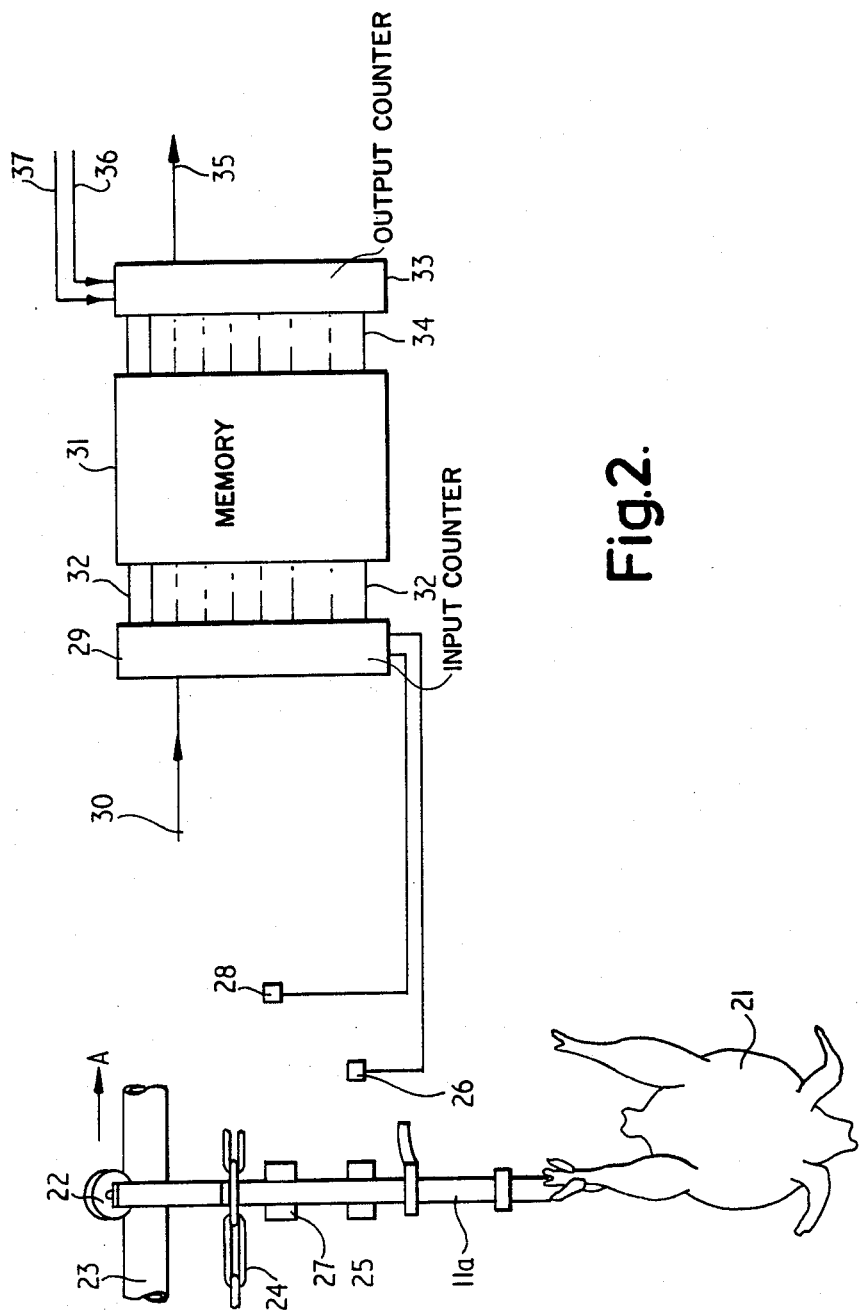
FIG. 2 is a diagrammatic view of part of a second embodiment of a conveyor according to the invention.

The invention as described in principle with reference to FIGS. 2 and 3 can be used not only to control an entire processing system but also to transmit information from one station to another on any conveyor system, including conveyor systems which are otherwise conventional. Various examples will now be described, commencing with an entire processing system with reference to FIG. 1.

The complete poultry processing system shown in FIG. 1 has a control unit 17 arranged to receive information about grade and weight from the grading and weighing stations 12 and 13, and the unit subsequently controls the operation of the removal stations 14, 15 and 16.

The grading station 12 has a counting sensor 12a similar to the sensor 28 of FIG. 3 and this is connected via line 40 to a first input counter section 41 of the control unit 17. The counter section 41 has an associated memory 42 and output counter section 43 arranged in a similar manner to the apparatus shown in FIG. 3. Thus when the datum shackle 11a reaches the grading station 12, the counter section 41 is set to the numeral 1, and opens the part of memory 42 which is associated with that number.

A grading device is connected by line 44 to the counter 41 so when each shackle passes the grading station 12, information about the grade of carcass carried by that particular shackle is stored in the appropriate part of the memory 42.

There is a similar sensor 13a at the weighing station 13 and that sensor is connected via line 45 to the output gating device 43. Thus when any particular shackle reaches the weighing station 13, the count recorded by the counter 43 corresponds to the number allocated to that shackle and so the grading information which was originally generated by the carcass carried by that shackle becomes available from the memory 42 on line 46. This information is received by conventional grade and weight processing circuitry 47. At the same time this circuitry receives information about the weight of the carcass on line 48. The circuitry 47 processes the grade and weight information and computes at which of the stations 14, 15, or 16 the particular carcass is to be removed, to fulfill the requirements of the operator of the system. This information as to the removal station to be selected is fed on line 49 into a second input counter section 50 of the control unit. This also has an associated memory 51 and output counter section 52, arranged in the manner of the circuitry shown in FIG. 3. Since the sensor 13a is also coupled to the counter section 50 via line 53, the information on line 49 is fed into a part of memory 51 which is associated with the particular shackle in question.

Each of the stations 14, 15 and 16 has a sensor 14a, 15a, and 16a, respectively, connected to counters 52a, 52b and 52c each forming part of the output counter section 52. When any particular shackle reaches the station 14 for example, the sensor 14a causes the counter 52a of counter section 52 to deliver the information contained in the memory section having the appropriate number to an output line 54 communicating with the station 14. This may be a signal to remove the carcass at station 14 if the carcass has the desired properties, or the carcass may be allowed to remain for removal at stations 15 or 16. The stations 15 and 16 operate in a similar manner via their respective counters 52b and 52c.

The grading station 12 and means for grading situated at the grading station may be conventional. For example a manually operated grading console can be used, for example as described in U.S. Pat. No. 4,021,336. Alternatively, articles may be graded as a result of the precise point at which they are loaded on to the conveyor. For example a grading method may be used as described in U.S. Pat. No. 4,122,953, in which different grades of article are loaded on to the conveyor at different points respectively so that an article of one grade will travel past more grading sensors than an article of another grade, the control circuitry allocating a particular grade to a particular carcass dependent on the number of grading signals generated by that carcass. There would be a unit as shown in FIG. 2, or FIG. 3, positioned at each grading sensor. At a downstream station where the grading information was required, the following sequence of events would take place for each shackle arriving at the downstream station. The arrival of the shackle at the downstream station would actuate a sensor and cause the output counting sections 33 of the grader memories to supply the information contained in the memories relating to that particular shackle. This information would be received by the grader logic circuitry disclosed in U.S. Pat. No. 4,122,953 which would compute a particular grade for the carcass. For example if the carcass had been loaded at a point where it did not pass any grading sensors, no information would be received from the memories and an appropriate grade would be allocated. If on the other hand the carcass had been loaded at a point where it passed one grading sensor, then one of the memories would contain a signal and this would be used to compute the appropriate grade. Similarly if the carcass had been loaded at a point where it passed two or more grading sensors, then two or more memories would supply signals to the logic circuitry and appropriate grades would be computed. This information as to grade would then be available for use as desired. For example it might be fed to circuitrys such as that indicated at 47 in FIG. 1, for use in comparing grade information and weight information and computing a particular article removal point.

Similarly the weighing station 13 and associated means for weighing may be conventional. It may for example be as described in British Pat. No. 1488345 or 1488346. Alternatively the weighing apparatus may be as described in U.S. Pat. No. 3,997,013. The control circuitry may include means to automatically check the calibration of the weighing means, for example as described in U.S. Pat. No. 3,997,013.

If desired the last shackle 11b may be a test shackle which is not loaded with a poultry carcass. The section of memory 51 associated with shackle 11b is permanently set to give a signal to the counting section 52 which indicates that a carcass is to be removed from the conveyor. Thus if the system is operating satisfactorily, each time the shackle 11b reaches any of the stations 14, 15 and 16, the article removal mechanism at the station should operate. The shackle 11b can be specially identified, for example by painting it a different colour, so that the operator can check visually that the stations 14, 15 and 16 are operating correctly when shackle 11b reaches those stations.

While the invention is particularly suitable for controlling an entire poultry processing conveyor system as shown in FIG. 1, units such as those shown in FIGS. 2 and 3 can be used whenever information generated by a succession of articles at one station is required to be correlated with those articles at another station downstream. The system is totally independent of the time taken for the articles to move from one station to another and of the distance between the articles, since the system operates purely on the principle that the articles follow one another in sequence. The articles can move faster or slower at different points along the conveyor and the spacing between the articles can vary at different points along the conveyor without affecting the system. The invention is therefore particularly suitable for conveying information over long distances, where conventional systems relying on precise spacing of the shackles may get out of step since the problems resulting from slight fluctuations in spacing multiply with the length of the conveyor.

Figure 5:
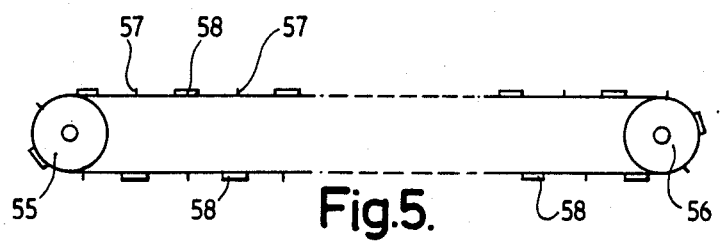
FIG. 5 is a view of yet another embodiment of a conveyor according to the invention.

The invention is not restricted to the details of the foregoing embodiments. For instance although the conveyor is particularly suitable for use in the processing of poultry, the invention can be applied to any conveyor where a succession of articles are conveyed along a path and one or more operations are carried out on the article at points along the path. The operations may simply involve identifying, either automatically or manually, a particular characteristic of an article, such as weight or appearance, or it may involve manipulation of the article in some way, for example by removing the article from the conveyor or deflecting it along a new path. The invention is for example applicable to a belt conveyor which is used to convey a succession of spaced apart articles along a path. FIG. 5 illustrates in side view a suitable form of conveyor belt for use with the control circuitry of the invention. The belt, which runs between two rollers 55 and 56, is divided into a series of short flights by cross-members 57. Each flight is provided with an actuating member 58 arranged to operate counters at the various stations. The actuating members comprise strips of metal on the surface of the belt conveyor. When loading the conveyor, each article is placed on one of the flights adjacent to one of the actuating members and that article would thereafter be associated with a particular number by the action of the associated actuating member on the counters.

Figure 4:
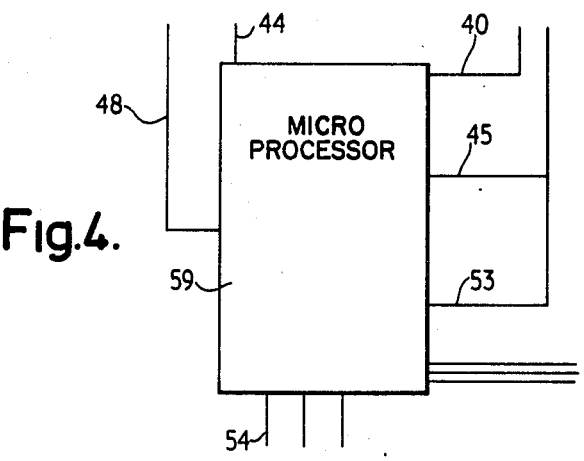
FIG. 4 is a diagrammatic view of an alternative control unit for use with the conveyor shown in FIG. 1.

If desired, the control unit 17 may be replaced by a computer or micro-processor as illustrated at 59 in FIG. 4. The computer or micro-processor 59 can be arranged to receive all the necessary information, associate the information received with a particular article in response to the information received simultaneously from the sensors, and control the removal stations 14, 15 and 16.

Although in the above embodiments each memory section stores a single piece of information related to the associated article carrier which is then brought out of store either for immediate use or for combination with other information relates to the associated article carrier, each memory section may be arranged to receive and store a succession of items of information related to the associated article carrier so that the control unit can thus build up a dossier or memory bank of information related to each particular article carrier. Each memory section may be arranged to process the information therein and carry out computing steps using the various items of information supplied to the memory section, the results of the computation being available for recall when the article carrier reaches a station where the results of the computation are required.

For some applications it may be sufficient for memory sections to be capable of storing a single simple item of information, for instance a "yes" or "no" signal, e.g. as to whether or not a particular article has passed a particular grading sensor. For other applications memory sections may need to be such that they can store more complex information, for example a signal related to the weight of an article.

In the arrangement shown in FIG. 1, the various stations are well spaced apart around the conveyor line and it is necessary for the control unit to have as many sections as there are shackles on the entire continuous conveyor.

However as described with reference to FIGS. 2 and 3, there may be cases where an entire poultry processing system is not controlled by the control unit, or where the various stations occupy less than half the total conveyor length. There may for example just be a weighing station such as 13, closely followed by drop-off parts such as 14 to 16. In such cases, the shackles can notationally be divided into separate linear groups of shackles, each group covering a linear distance which is greater than the linear distances occupied by the various stations. The leading shackle of each group is provided with means to reset the counters, so that instead of the control unit identifying say fifty shackles by the numbers 1 to 50, it might identify two groups each numbered 1 to 25, but since all processing operations on a shackle of the first group will be carried out before a shackle of the second group bearing the same number reaches the start of the processing, the fact that more than one shackle has the same number does not matter and the number of memory sections required can be substantially reduced.

I claim:

1. A conveyor system for sorting poultry carcasses comprising:
   (a) a plurality of carriers arranged to travel in succession along a path, each carrier including means to support a poultry carcass;
   (b) first and second data input stations arranged along said path, each station comprising means for sensing the presence of a carrier and means for inputting data relating to a characteristic of a poultry carcass, said means for inputting data at said first data input station being adapted to input first data different from said data capable of being inputted by said data input means at said second data input station;
   (c) a plurality of release stations along said path downstream of said data input stations, each said release station comprising detecting means for detecting the presence of a carrier and means for removing a poultry carcass from a carrier; and
   (d) control means comprising:
      (1) a first memory means having an input and an output,
      (2) a first input counter section connected to the input of said first memory means,
      (3) a first output counter section connected to the output of said first memory means,
      (4) a second memory means having an input and an output,
      (5) a second input counter section connected to the input of said second memory means,
      (6) a second output counter section connected to the output of said second memory means and comprising a plurality of counters, each counter being associated with one of said release stations,
      (7) data processing means for classifying poultry,
      (8) means connecting said data processing means to said first output counter section and to said second input counter section,
      (9) means connecting said sensing means at said first data input station with said first input counter section and means connecting said data input means at said first data input station with said first input counter section whereby data associated with each successive poultry carcass is stored successively in said first memory means,
      (10) means connecting said data input means at said second data input station with said data processing means and means connecting said sensing means at said second data input station with said first output counter section and with said second input counter section whereby each successive first data is transmitted from said first memory means to said data processing means, said data processing means associates successive first data with successive second data and generates classifying data for each successive poultry carcass, and said classifying data is successively stored in said second memory means, and
      (11) separate means connecting each of said detecting means at said release stations with the respective associated counter of said second output counter section and separate means connecting each of the associated counters of said second output counter section with each of said poultry carcass-removing means at the respective release station whereby the presence of a poultry carcass on a carrier at a release station causes the transmission of the classifying data associated with said poultry carcass to be transmitted to said release station and said poultry carcass to be removed from said carrier at a predetermined one of said release stations, (e) whereby said conveyor system maintains an individual identification of said poultry carcass carriers passing through each of said stations independent of the distance between said carriers and independent of the time lapse between a poultry carcass carrier passing one station and the next station.

2. The conveyor system as claimed in claim 1 wherein said means for inputting data at each of said first and second data input stations is adapted to input data corresponding to the grade and weight, respectively, of each poultry carcass.

3. The conveyor system of claim 1 wherein said plurality of carriers are arranged to travel in succession about an endless path.

4. A conveyor system as claimed in claim 3 wherein one of said carriers comprises datum means for resetting each of said counters when all of said carriers have completed a circuit past each of said sensors.

5. A conveyor system as claimed in claim 4 wherein each of said carriers comprises a first sensor actuating means and said one carrier comprises a second sensor actuating means in addition to said first sensor actuating means and each of said sensing means comprises first and second sensors arranged to be actuated by said first and second sensor actuating means respectively, said second sensor being arranged to reset the respective counter upon being actuated by said second sensor actuating means of said one carrier.

6. A conveyor system as claimed in claim 4 wherein each of said carriers comprises sensor actuating means, the sensor actuating means of said one carrier being adapted to actuate each of said sensing means for a longer period of time than each of the remainder of said sensor actuating means, whereby each of said sensing means generates and transmits to the respective computer section a longer signal when actuated by said sensor actuating means of said one carrier than the length of the signal generated by each of said sensing means when actuated by each of the remainder of said sensor actuator means.

7. A conveyor system as claimed in claim 6 further comprising means interposed between each of said sensing means and the respective counter section to prevent, when said conveyor system is stopped, a longer signal being generated by one of said sensing means when actuated by one of said remainder of said sensor actuating means and prevent the respective counter section from being reset.

8. A conveyor system as claimed in claim 7 wherein said interposed prevention means comprises an AND gate and means for sensing when said conveyor system is operating and not operating and for transmitting a signal to said AND gate to maintain said AND gate closed when said conveyor system is operating and to open said gate when said conveyor system is stopped.

9. The conveyor system as claimed in claim 1 wherein said control means comprises a microprocessor.

* * * * *